US012786820B2

(12) United States Patent
Sogabe et al.

(10) Patent No.: US 12,786,820 B2
(45) Date of Patent: Nov. 3, 2026

(54) BASE STATION, AND COMMUNICATION CONTROL METHOD

(71) Applicants: DENSO CORPORATION, Kariya-city (JP); TOYOTA JIDOSHA KABUSHIKI KAISHA, Toyota (JP)

(72) Inventors: Haruhiko Sogabe, Kariya-city (JP); Hideaki Takahashi, Kariya-city (JP)

(73) Assignees: DENSO CORPORATION, Kariya-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 18/492,652

(22) Filed: Oct. 23, 2023

(65) Prior Publication Data

US 2024/0064588 A1 Feb. 22, 2024

Related U.S. Application Data

(63) Continuation of application No. PCT/JP2022/017991, filed on Apr. 18, 2022.

(30) Foreign Application Priority Data

Apr. 28, 2021 (JP) ................................ 2021-076736

(51) Int. Cl.
*H04W 36/00* (2009.01)
*H04W 36/08* (2009.01)
*H04W 36/16* (2009.01)

(52) U.S. Cl.
CPC ....... *H04W 36/0083* (2013.01); *H04W 36/08* (2013.01); *H04W 36/16* (2013.01)

(58) Field of Classification Search
CPC . H04W 36/0083; H04W 36/08; H04W 36/16; H04W 36/008355; H04W 24/02; H04W 8/22; H04W 4/70; H04W 92/20
See application file for complete search history.

(56) References Cited

U.S. PATENT DOCUMENTS 12,425,940 B2 * 9/2025 Xin .................. H04W 36/0016
2017/0230935 A1 8/2017 Xu et al.
(Continued)

FOREIGN PATENT DOCUMENTS

EP 3051878 A1 8/2016
JP 2016533656 A 10/2016
(Continued)

OTHER PUBLICATIONS

3GPP TS 38.423 V16.5.0, 3rd Generation Partnership Project; Technical Specification Group Radio Access Network; NG-RAN; Xn application protocol (XnAP) (Release 16), pp. 1-461, Apr. 2021.
RP-201677 Revised SID on Study on support of reduced capability NR devices, pp. 1-5, Sep. 14-18, 2020.
RP-210918 RedCap WID update-cl, 3GPP TSG RAN, Nokia, Ericsson, Revised WID on support of reduced capability NR devices, pp. 1-6, Mar. 22-26, 2021.
(Continued)

*Primary Examiner* — Charles T Shedrick

(74) *Attorney, Agent, or Firm* — Harness, Dickey & Pierce, P.L.C.

(57) ABSTRACT

A base station according to an aspect of the present disclosure comprises: a network communicator configured to receive, from a neighboring base station, information for determination for determining whether or not the neighboring base station is capable of communicating with a capability-limited user equipment having a limited communication capability; and a controller configured to acquire the information for determination.

6 Claims, 9 Drawing Sheets

(56) References Cited

U.S. PATENT DOCUMENTS

| | | | | |
|---|---|---|---|---|
| 2021/0235339 | A1* | 7/2021 | Babaei | H04W 36/06 |
| 2022/0286355 | A1* | 9/2022 | Park | H04L 41/0806 |
| 2022/0287134 | A1* | 9/2022 | Centonza | H04W 76/19 |
| 2023/0007603 | A1* | 1/2023 | Sui | H04W 72/0453 |
| 2023/0276253 | A1* | 8/2023 | Niemelä | H04W 16/22<br>370/329 |
| 2023/0284131 | A1* | 9/2023 | Höglund | H04W 48/12<br>370/329 |
| 2024/0171968 | A1* | 5/2024 | Starsinic | H04W 12/72 |
| 2024/0205760 | A1* | 6/2024 | Huang | H04W 36/0055 |
| 2024/0365184 | A1* | 10/2024 | Bergström | H04W 36/0069 |
| 2024/0365212 | A1* | 10/2024 | Park | H04L 41/0853 |
| 2025/0024515 | A1* | 1/2025 | Zhang | H04W 74/0891 |
| 2025/0089017 | A1* | 3/2025 | Wang | H04W 74/0808 |
| 2025/0097800 | A1* | 3/2025 | Hu | H04W 68/00 |

FOREIGN PATENT DOCUMENTS

| | | | | |
|---|---|---|---|---|
| WO | WO-2015169387 A1 | * | 11/2015 | H04W 36/0055 |
| WO | WO-2024029263 A1 | * | 2/2024 | H04W 72/0453 |
| WO | WO-2025030546 A1 | * | 2/2025 | H04L 1/1607 |

OTHER PUBLICATIONS

3GPP TSG RAN, "Evolved Universal Terrestrial Radio Access Network (E-UTRAN); X2 Application Protocol (X2AP) (Release 16)", 3GPP TS 36.423 V16.5.0, Apr. 2021, pp. 77-80.

3GPP TSG RAN, "Study on Support of Reduced Capability NR Devices (Release 17)", 3GPP TR 38.875, V1.1.0, Mar. 2021, pp. 9 and 69-71.

OPPO, "Enhancements on Multi-Beam Operation", Document R1-2100118, 3GPP TSG RAN WG1 #104e, Jan. 25-Feb. 5, 2021.

* cited by examiner

FIG. 6

9.2.2.11 Served Cell Information NR

This IE contains cell configuration information of an NR cell that a neighbouring NG-RAN node may need for the Xn AP interface.

| IE/Group Name | Presence | Range | IE type and reference | Semantics description | Criticality | Assigned Criticality |
|---|---|---|---|---|---|---|
| NR-PCI | M | | INTEGER (0..1007, ...) | NR Physical Cell ID | – | |

• • •

| | | | | | | |
|---|---|---|---|---|---|---|
| redCap-AccessAllowed | O | | ENUMERATED (not-broadcast, broadcast, ...) | This IE indicates whether redCap-AccessAllowed is broadcast or not. | YES | ignore |
| singleRx-AccessAllowed | O | | ENUMERATED (not-broadcast, broadcast, ...) | This IE indicates whether singleRx-AccessAllowed is broadcast or not. | YES | ignore |
| twoRx-AccessAllowed | O | | ENUMERATED (not-broadcast, broadcast, ...) | This IE indicates whether twoRx-AccessAllowed is broadcast or not. | YES | ignore |

FIG. 7

8.4.1 Xn Setup

...

8.4.1.2 Successful Operation

...

If the redCap-AccessAllowed IE is contained in the XN SETUP REQUEST message, the NG-RAN node2 shall, if supported, use it to determine a suitable target in case of subsequent outgoing mobility involving RedCap UEs.

If the redCap-AccessAllowed IE is contained in the XN SETUP RESPONSE message, the NG-RAN node1 shall, if supported, use it to determine a suitable target in case of subsequent outgoing mobility involving RedCap UEs.

If the singleRx-AccessAllowed IE is contained in the XN SETUP REQUEST message, the NG-RAN node2 shall, if supported, use it to determine a suitable target in case of subsequent outgoing mobility involving RedCap UEs.

If the singleRx-AccessAllowed IE is contained in the XN SETUP RESPONSE message, the NG-RAN node1 shall, if supported, use it to determine a suitable target in case of subsequent outgoing mobility involving RedCap UEs.

If the twoRx-AccessAllowed IE is contained in the XN SETUP REQUEST message, the NG-RAN node2 shall, if supported, use it to determine a suitable target in case of subsequent outgoing mobility involving RedCap UEs.

If the twoRx-AccessAllowed IE is contained in the XN SETUP RESPONSE message, the NG-RAN node1 shall, if supported, use it to determine a suitable target in case of subsequent outgoing mobility involving RedCap UEs.

FIG. 8

8.4.2 NG-RAN node Configuration Update

• • •

8.4.2.2 Successful Operation

• • •

If the redCap-AccessAllowed IE is contained in the NG-RAN NODE CONFIGURATION UPDATE message, the NG-RAN node2 shall, if supported, use it to determine a suitable target in case of subsequent outgoing mobility involving RedCap UEs.

If the redCap-AccessAllowed IE is contained in the NG-RAN NODE CONFIGURATION UPDATE ACKNOWLEDGE message, the NG-RAN node1 shall, if supported, use it to determine a suitable target in case of subsequent outgoing mobility involving RedCap UEs.

If the singleRx-AccessAllowed IE is contained in the NG-RAN NODE CONFIGURATION UPDATE message, the NG-RAN node2 shall, if supported, use it to determine a suitable target in case of subsequent outgoing mobility involving RedCap UEs.

If the singleRx-AccessAllowed IE is contained in the NG-RAN NODE CONFIGURATION UPDATE ACKNOWLEDGE message, the NG-RAN node1 shall, if supported, use it to determine a suitable target in case of subsequent outgoing mobility involving RedCap UEs.

If the twoRx-AccessAllowed IE is contained in the NG-RAN NODE CONFIGURATION UPDATE message, the NG-RAN node2 shall, if supported, use it to determine a suitable target in case of subsequent outgoing mobility involving RedCap UEs.

If the twoRx-AccessAllowed IE is contained in the NG-RAN NODE CONFIGURATION UPDATE ACKNOWLEDGE message, the NG-RAN node1 shall, if supported, use it to determine a suitable target in case of subsequent outgoing mobility involving RedCap UEs.

BASE STATION, AND COMMUNICATION CONTROL METHOD

CROSS-REFERENCE TO RELATED APPLICATIONS

The present application is a continuation application of international Patent Application No. PCT/JP2022/017991, filed on Apr. 18, 2022, which designated the U.S., and claims the benefit of priority of Japanese Patent Application No. 2021-076736, filed on Apr. 28, 2021, the entire contents of which are incorporated herein by reference.

TECHNICAL FIELD

The present disclosure relates to a base station, and a communication control method used in a mobile communication system.

BACKGROUND ART

In recent years, in 3GPP (registered trademark, the same applies hereinafter) that is a mobile communication system standardization project, it has been studied to provide capability-limited user equipment (so-called RedCap UE) having a limited communication capability compared to a communication capability of normal user equipment in a 5G system (see, for example, Non Patent Literature 1). In such capability-limited user equipment, for example, a maximum bandwidth to be used for communication is limited, or the number of receive branches is limited.

CITATION LIST

Non Patent Literature

Non Patent Literature 1: 3GPP Contribution "R2-210918"

SUMMARY OF INVENTION

A base station according to an aspect of the present disclosure comprises: a network communicator configured to receive, from a neighboring base station, information for determination for determining whether or not capability-limited user equipment having a limited communication capability and the neighboring base station are capable of communicating with each other; and a controller configured to acquire the information for determination.

A base station according to an aspect of the present disclosure comprises: a controller configured to generate information for determination to be used by a neighboring base station to determine whether or not capability-limited user equipment having a limited communication capability and the base station are capable of communicating with each other; and a network communicator configured to transmit the information for determination to the neighboring base station.

A communication control method according to an aspect of the present disclosure comprises: the communication control method to be executed in a base station, the communication control method comprising the steps of: receiving, from a neighboring base station, information for determination for determining whether or not capability-limited user equipment having a limited communication capability and the neighboring base station are capable of communicating with each other; and acquiring the information for determination.

BRIEF DESCRIPTION OF DRAWINGS

Objects, features, advantages, and the like, of the present disclosure will become more apparent from the following detailed description with reference to the accompanying drawings.

FIG. 6 is a view illustrating an example of information included in a message according to the embodiment of the present disclosure.

FIG. 7 is a view illustrating an operation example of a BS in Operation Example 1 of the mobile communication system according to the embodiment of the present disclosure.

FIG. 8 is a view illustrating an operation example of the BS in Operation Example 1 of the mobile communication system according to the embodiment of the present disclosure.

DESCRIPTION OF EMBODIMENTS

Figure 1:
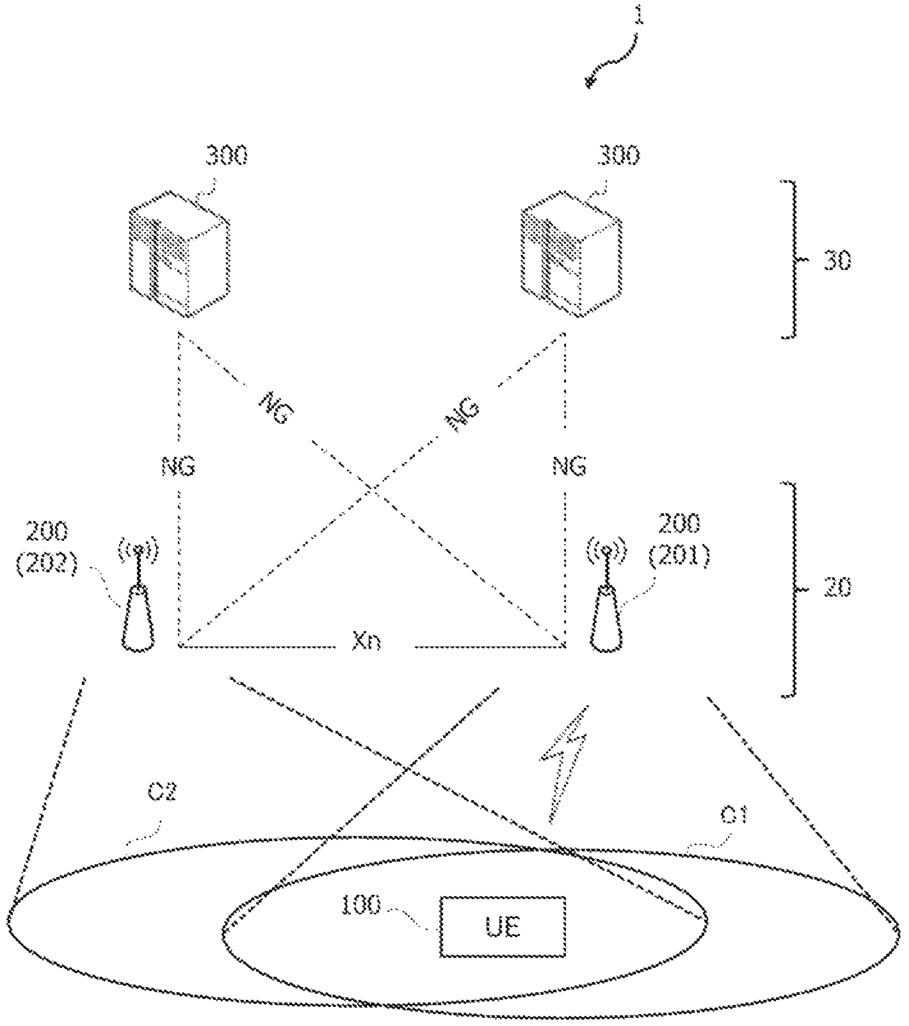
FIG. 1 is an explanatory diagram illustrating an example of a schematic configuration of a system according to an embodiment of the present disclosure.

Hereinafter, an embodiment of the present disclosure will be described in detail with reference to the accompanying drawings. Note that, in the present specification and the drawings, components that can be described in a similar manner are denoted by the same or similar reference numerals, and redundant description can be omitted.

For a base station, communication with capability-limited user equipment requires control different from control for communication with normal user equipment, so that there may be a base station that cannot communicate with the capability-limited user equipment.

Here, in a case where the capability-limited user equipment is in an RRC connected state in which an RRC connection is established between the base station and the capability-limited user equipment, for example, it is assumed that handover is performed from a cell managed by the base station to a neighboring cell managed by a neighboring base station as a result of movement of the capability-limited user equipment.

In a case where the neighboring base station does not support communication with the capability-limited user equipment, there is a problem that the capability-limited user equipment fails to handover to the neighboring cell, and communication of the capability-limited user equipment is interrupted.

It is therefore an object of the present invention to provide a base station and a communication control method capable of preventing a handover failure of capability-limited user equipment.

(1) System Configuration (1.1) System Overview

An example of a configuration of a system 1 according to an embodiment of the present disclosure will be described with reference to FIG. 1. The system 1 is, for example, a mobile communication system conforming to a technical specification (Technical Specification (TS)) of 3GPP which is a mobile communication system standardization project. Hereinafter, as the system 1, a 5th generation system (5th Generation System (5GS)) of the 3GPP standard, that is, a mobile communication system based on NR (New Radio) will be described as an example. Note that the system 1 is not limited to this example. The system 1 may be a system conforming to a TS of LTE (Long Term Evolution) or another generation system (for example, a 6th generation) of the 3GPP standard. The system 1 may be a system conforming to a TS of a standard other than the 3GPP standard.

As illustrated in FIG. 1, the system 1 includes a 5G radio access network (so-called next generation radio access network (NG-RAN)) 20, a 5G core network (5G core network (5GC)) 30, and user equipment (User Equipment (UE)) 100.

The NG-RAN 20 includes a base station (Base Station (BS)) 200 that is a node of a radio access network. The BS 200 is a radio communication apparatus that performs radio communication with the UE 100. The BS 200 manages one or a plurality of cells. The BS 200 performs radio communication with the UE 100 that has established a connection in a radio resource control (RRC) layer with its own cell. The base station 200 has a radio resource management (RRM) function, a routing function of user data (hereinafter, simply referred to as "data"), a measurement control function for mobility control and scheduling, and the like. The "cell" is used as a term indicating a minimum unit of a radio communication area. The "cell" is also used as a term indicating a function or a resource that performs radio communication with the UE 100. One cell belongs to one carrier frequency. FIG. 1 illustrates an example in which a BS 201 manages a cell C1 and a BS 202 manages a cell C2. The UE 100 is located in an overlapping region of the cell C1 and the cell C2.

The BS 200 communicates with the UE 100 using, for example, a protocol stack of the RAN. The protocol stack includes, for example, a RRC (Radio Resource Control) layer, a SDAP (Service Data Adaptation Protocol) layer, a PDCP (Packet Data Convergence Protocol) layer, a RLC (Radio Link Control) layer, a MAC (Medium Access Control) layer, and a physical (Physical (PHY)) layer. However, in a case of LTE, there may be no SDAP layer.

The BS 200 is, for example, a gNB that provides protocol terminations of an NR user plane and a control plane toward the UE 100 and is connected to the 5GC 30 via an NG interface. Note that the BS 200 may be, for example, an eNB that provides protocol terminations of an E-UTRA user plane and a control plane toward the UE 100 in LTE.

The BS 200 may include a plurality of units. The plurality of units may include a first unit that hosts a higher layer included in the protocol stack and a second unit that hosts a lower layer included in the protocol stack. The higher layer may include an RRC layer, an SDAP layer, and a PDCP layer, and the lower layer may include an RLC layer, a MAC layer, and a PHY layer. The first unit may be a CU (Central Unit), and the second unit may be a DU (Distributed Unit). The plurality of units may include a third unit that performs processing of a lower layer of the PHY layer. The second unit may perform processing of a higher layer of the PHY layer. The third unit may be a RU (Radio Unit). The BS 200 may be one of the plurality of units and may be connected to another unit among the plurality of units. In addition, the BS 200 may be an IAB (Integrated Access and Backhaul) donor or an IAB node.

The 5GC 30 includes a core network apparatus 300. The core network apparatus 300 is an apparatus corresponding to a control plane and may be an apparatus that performs various mobility management for the UE 100. The core network apparatus 300 communicates with the UE 100 using non-access stratum (NAS) signaling and manages information on a tracking area in which the UE 100 exists. The core network apparatus 300 performs paging through the base station 200 in order to notify the UE 100 of an incoming call. The core network apparatus 300 may be an AMF (Access and Mobility Management Function) of 5G/NR or a MME (Mobility Management Entity) of 4G/LTE.

The core network apparatus 300 is an apparatus compatible with a user plane and performs transfer control of data of the UE 100. The core network apparatus 300 may be a UPF (User Plane Function) of 5G/NR or a S-GW (Serving Gateway) of 4G/LTE.

The core network apparatus 300 may include, for example, an AMF and/or a UPF. The core network apparatus 300 is connected to the BS 200 via the NG interface.

The UE 100 may communicate with the BS 200 in a case where the UE 100 is located within a coverage area of the BS 200. The UE 100 may communicate with the BS 200 using the protocol stack described above.

The UE 100 is an example of a communication apparatus that communicates with the base station 200. The UE 100 may be an apparatus to be used by the user. The UE 100 is, for example, a mobile radio communication apparatus such as a mobile phone terminal such as a smartphone, a tablet terminal, a notebook PC, a communication module, or a communication card. Furthermore, the UE 100 may be a vehicle (for example, a car, a train, or the like) or an apparatus provided in the vehicle. The UE 100 may be a transport body other than a vehicle (for example, a ship, an airplane, or the like) or an apparatus provided in the transport body other than a vehicle. Furthermore, the UE 100 may be a sensor or an apparatus provided in the sensor. Note that the UE 100 may be referred to as another name such as a mobile station, a mobile terminal, a mobile apparatus, a mobile unit, a subscriber station, a subscriber terminal, a subscriber apparatus, a subscriber unit, a wireless station, a wireless terminal, a wireless apparatus, a wireless unit, a remote station, a remote terminal, a remote apparatus, or a remote unit.

The UE 100 may be capability-limited user equipment (so-called RedCap UE) having a limited communication capability compared to a communication capability of normal UE (general UE). Thus, the RedCap UE has a reduced communication capability than the general UE. The RedCap UE may have middle range performance and price for IoT. Note that the general UE is NR UE, and has, for example, an advanced communication capability that is a feature of the NR. Specifically, the general UE is, for example, UE that satisfies enhanced mobile broadband (enhanced Mobile Broadband (eMBB)) and ultra-reliable and low latency communications (Ultra-Reliable and Low Latency Communications (URLLC)).

The RedCap UE may be, for example, UE with reduced equipment cost and complexity compared to general UE that meets high performance, high speed, high capacity and ultra-reliable low latency of Rel-15 or Rel-16. The RedCap UE may be capable of communicating at a communication speed equal to or higher than a communication speed defined by a LPWA (Low Power Wide Area) standard (for example, LTE Cat.1/1bis, LTECat.M1 (LTE-M), LTE-Cat.NB1 (NB-IoT)).

The RedCap UE may be capable of communicating with a bandwidth equal to or greater than a bandwidth defined in the LPWA standard. The RedCap UE may have a limited bandwidth to be used for communication as compared with the UE of Rel-15 or Rel-16. In a FR1 (Frequency Range 1), for example, a maximum bandwidth of the RedCap UE may be 20 MHz. In a FR2 (Frequency Range 2), for example, a maximum bandwidth of the RedCap UE may be 100 MHz.

The RedCap UE may have only one receive chain (Rx chain) for receiving a radio signal or may have only two receive chains. In addition, in a frequency band in which normal UE (so-called legacy NR UE) needs to include at least two reception antenna ports (Rx antenna ports), the RedCap UE may support communication using a single receive branch (Rx branch). In the frequency band, the RedCap UE may support communication using two receive branches.

In addition, in a frequency band in which the normal UE needs to have a minimum of four reception antenna ports, the RedCap UE may support communication using a single receive branch. In the frequency band, the RedCap UE may support communication using two receive branches.

In a case where the RedCap UE has a single receive branch, a maximum number of DL MIMO layers may be one. In a case where the RedCap UE has two receive branches, a maximum number of DL MIMO layers may be two.

The RedCap UE may be, for example, an industrial wireless sensor, a video surveillance apparatus, or a wearable apparatus. Note that the RedCap UE may be referred to as a reduced capability NR device.

(1.2) Configuration Example of Protocol Stack

Figure 2:
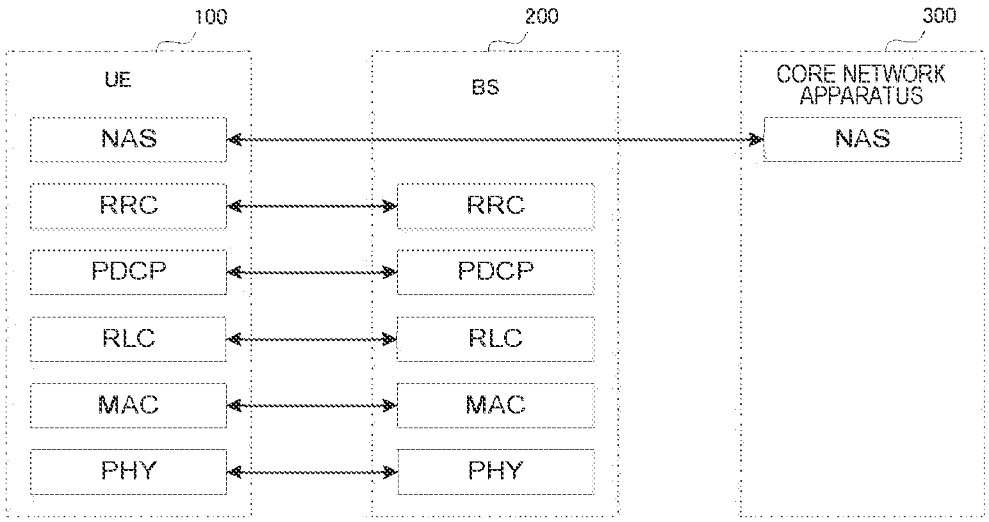
FIG. 2 is a view illustrating a configuration example of a protocol stack of the system according to the embodiment of the present disclosure.

A configuration example of the protocol stack of the mobile communication system 1 will be described with reference to FIG. 2. As illustrated in FIG. 2, a protocol of a radio section between the UE 100 and the base station 200 includes a physical (PHY) layer, a MAC (Medium Access Control) layer, a RLC (Radio Link Control) layer, a PDCP (Packet Data Convergence Protocol) layer, and a RRC (Radio Resource Control) layer.

The PHY layer performs encoding/decoding, modulation/demodulation, antenna mapping/demapping, and resource mapping/demapping. Data and control information are transmitted between the PHY layer of the UE 100 and the PHY layer of the base station 200 via a physical channel.

The MAC layer performs priority control of data, retransmission processing by hybrid ARQ (HARD), random access procedure, and the like. Data and control information are transmitted between the MAC layer of the UE 100 and the MAC layer of the base station 200 via a transport channel. The MAC layer of the base station 200 includes a scheduler. The scheduler determines uplink and downlink transport formats (transport block size, modulation and coding scheme (MCS)) and resources to be allocated to the UE 100.

The RLC layer transmits data to the RLC layer on a reception side using functions of the MAC layer and the PHY layer. Data and control information are transmitted between the RLC layer of the UE 100 and the RLC layer of the base station 200 via a logical channel.

The PDCP layer performs header compression/decompression and encryption/decryption.

A SDAP (Service Data Adaptation Protocol) layer may be provided as a higher layer of the PDCP layer. The SDAP (Service Data Adaptation Protocol) layer performs mapping between an IP flow that is a unit in which a core network performs QoS control and a radio bearer that is a unit in which an AS (Access Stratum) performs QoS control.

The RRC layer controls a logical channel, a transport channel, and a physical channel according to establishment, re-establishment, and release of a radio bearer. RRC signaling for various configurations is transmitted between the RRC layer of the UE 100 and the RRC layer of the base station 200. In a case where there is an RRC connection between the RRC of the UE 100 and the RRC of the base station 200 (that is, the RRC connection is established), the UE 100 is in an RRC connected state. In a case where there is no RRC connection between the RRC of the UE 100 and the RRC of the base station 200 (that is, the RRC connection is not established), the UE 100 is in an RRC idle state. In a case where the RRC connection between the RRC of the UE 100 and the RRC of the base station 200 is suspended, the UE 100 is in an RRC inactive state.

The NAS layer located in a higher layer of the RRC layer performs session management and mobility management of the UE 100. NAS signaling is transmitted between the NAS layer of the UE 100 and the NAS layer of the core network apparatus 300.

Note that the UE 100 has an application layer, and the like, in addition to the protocol of the radio interface.

(1.3) Configuration of UE

Figure 3:
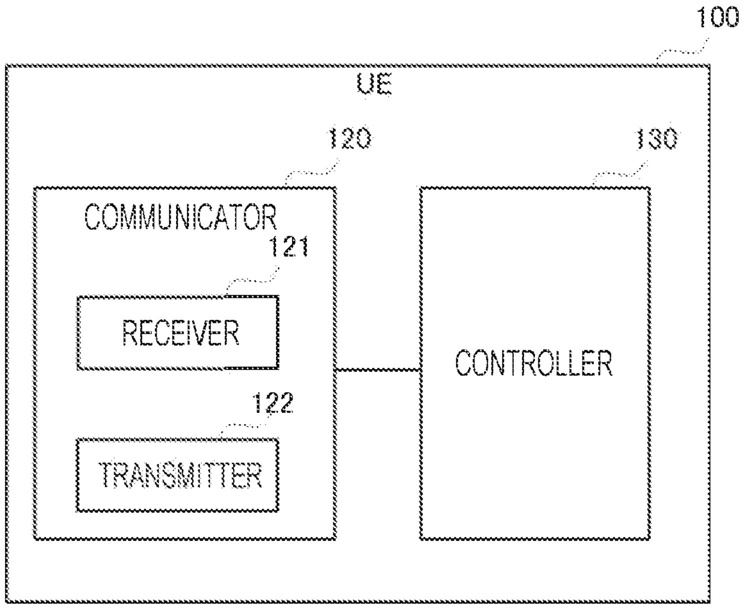
FIG. 3 is a view illustrating a configuration example of UE according to the embodiment of the present disclosure.

A configuration example of the UE 100 will be described with reference to FIG. 3. As illustrated in FIG. 3, the UE 100 includes a communicator 120 and a controller 130.

The communicator 120 communicates with other communication apparatuses by transmitting and receiving signals. For example, the communicator 120 receives a radio signal from the BS 200 and transmits a radio signal to the BS 200. Furthermore, for example, the communicator 120 may receive a radio signal from another UE and transmit a radio signal to another UE.

The communicator 120 includes a receiver 121 and a transmitter 122. The receiver 121 converts a radio signal received by the antenna into a received signal that is a baseband signal, performs signal processing on the received signal, and outputs the received signal to the controller 130. The transmitter 122 performs signal processing on a transmission signal that is a baseband signal to be output from the controller 130, converts the signal into a radio signal, and transmits the radio signal from the antenna.

The receiver 121 includes one or a plurality of receive chains (that is, Rx chains). The receive chain includes a reception antenna port (that is, Rx antenna port) and a reception circuit. The receive chain may constitute a receiver and may be referred to as a receiver. The receive chain may constitute part of the receiver. In addition, the receive chain may include one or more receive branches (Rx branches). The receive branch may include at least a reception antenna port. The reception antenna port is a logical reception antenna including one or a plurality of physical antennas.

The transmitter 122 includes one or a plurality of transmit chains (that is, Tx chains). The transmit chain includes a transmission antenna port (that is, Tx antenna port) and a transmission circuit. The transmit chain may constitute a transmitter and may be referred to as a transmitter. The transmit chain may constitute part of the transmitter. In addition, the transmit chain may include one or more transmit branches (Tx branches). The transmit branch may include at least a transmission antenna port. The transmission antenna port is a logical transmission antenna including one or a plurality of physical antennas.

Note that the receiver and the transmitter may be configured by one transceiver. In addition, the antenna may be used for both reception and transmission.

The controller 130 performs various kinds of control in the UE 100. The controller 130 controls, for example, communication with the BS 200 or another UE 100 via the communicator 120. Operation of the UE 100 to be described later may be operation under control of the controller 130.

The controller 130 may include one or more processors capable of executing a program and a memory that stores the program. The one or more processors may execute a program to perform the operation of the controller 130. The program may be a program for causing the processor to execute the operation of the controller 130.

The processor performs digital processing of signals to be transmitted and received via the antenna and the RF circuit. The digital processing includes processing of the protocol stack of the RAN. The processor may be a single processor. The processor may include a plurality of processors. The plurality of processors may include a baseband processor that performs digital processing and one or more processors that perform other processing. The memory stores a program to be executed by the processor, a parameter related to the program, and data related to the program. The memory may include at least one of a ROM (Read Only Memory), an EPROM (Erasable Programmable Read Only Memory), an EEPROM (Electrically Erasable Programmable Read Only Memory), a RAM (Random Access Memory), or a flash memory. All or part of the memory may be included in the processor.

Note that, in the following, operation of functional units (specifically, the communicator 120 and the controller 130) included in the UE 100 may be described as operation of the UE 100.

(1.4) Configuration of BS

Figure 4:
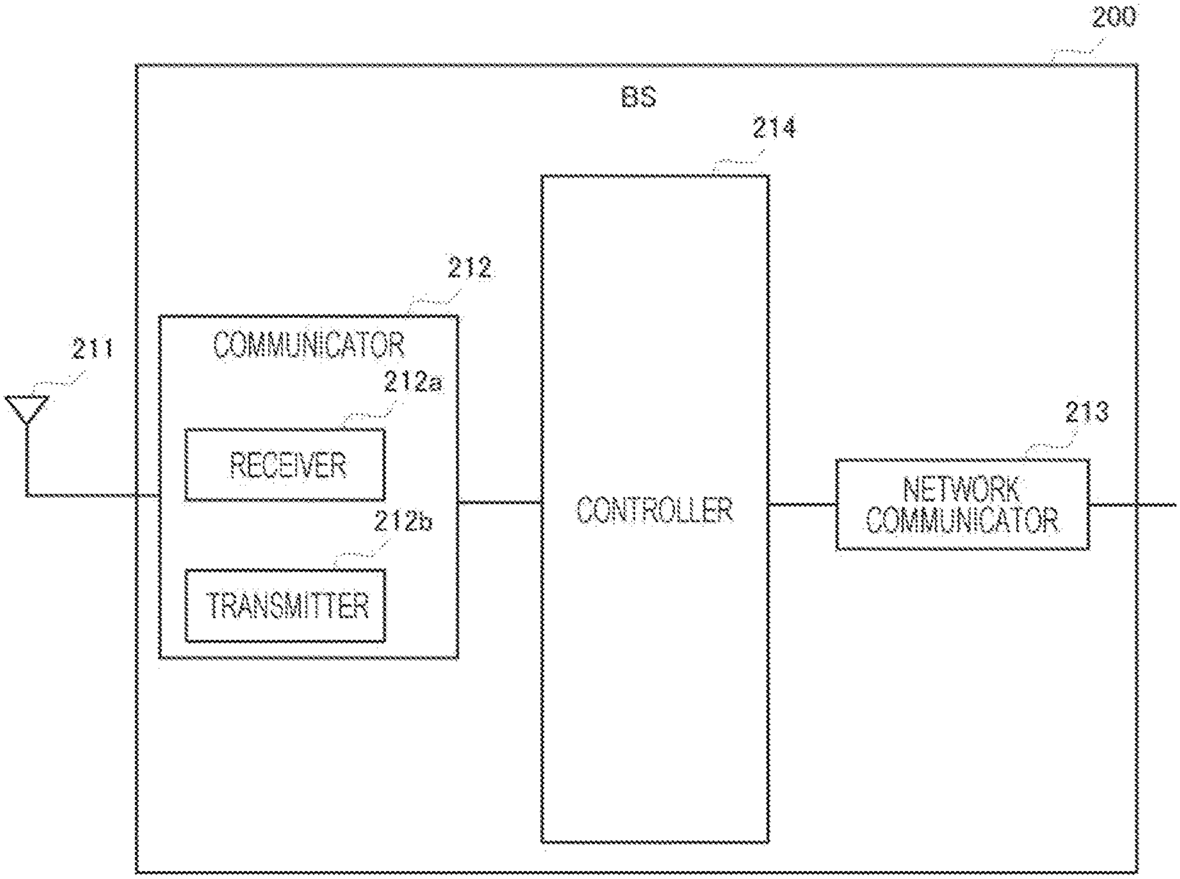
FIG. 4 is a view illustrating a configuration example of a BS according to the embodiment of the present disclosure.

A configuration example of the BS 200 will be described with reference to FIG. 4. As illustrated in FIG. 4, the BS 200 includes an antenna 211, a communicator 212, a network communicator 213, and a controller 214.

The communicator 212 communicates with the UE 100 via the antenna 211 under the control of the controller 214. The communicator 212 includes a receiver 212*a* and a transmitter 212*b*. The receiver 212*a* converts a radio signal received by the antenna 211 into a received signal that is a baseband signal, performs signal processing on the received signal, and outputs the signal to the controller 214. The transmitter 212*b* performs signal processing on the transmission signal that is a baseband signal output from the controller 214, converts the signal into a radio signal, and transmits the radio signal from the antenna 211.

The network communicator 213 is connected to the core network apparatus 300. The network communicator 213 performs network communication with the core network apparatus 300 under the control of the controller 214.

The controller 214 controls the communicator 212 and performs various kinds of control in the base station 200. The controller 214 includes at least one processor and at least one memory. The memory stores a program to be executed by the processor and information to be used for processing by the processor. The memory may include at least one of a ROM, an EPROM, an EEPROM, a RAM, or a flash memory. The processor may include a digital signal processor (DSP) that performs digital processing of digital signals and a central processing unit (CPU) that executes programs. Note that part of the memory may be provided in the communicator 212. Furthermore, the DSP may be provided in the communicator 212.

In the BS 200 configured as described above, the network communicator 213 receives information for determination for determining whether or not the RedCap UE and the neighboring base station can communicate with each other from the neighboring base station. The controller 214 acquires the information for determination. As a result, the controller 214 can determine whether or not the RedCap UE and the neighboring base station can communicate with each other on the basis of the information for determination. This enables the BS 200 to appropriately control a handover destination of the RedCap UE.

Further, the network communicator 213 may receive a message between base stations including the information for determination for each cell to be managed by the neighboring base station from the neighboring base station. The controller 214 can determine whether or not communication can be performed with the RedCap UE for each cell. This enables the BS 200 to appropriately determine a candidate cell for the handover destination, so that it is possible to appropriately control the handover destination of the RedCap UE.

In addition, the message between base stations is a message to be used to establish an interface between bases stations between the BS 200 and the neighboring base station, or a message related to update of the base station configuration.

In a case where the message between base stations is a message to be used to establish the interface between bases stations, the controller 214 can determine whether or not the RedCap UE and the neighboring base station can communicate with each other when the interface between bases stations is established. Furthermore, in a case where the message between base stations is a message related to update of the base station configuration, the controller 214 can determine whether or not the RedCap UE and the neighboring base station can communicate with each other when the base station configuration is updated.

In addition, the network communicator 213 may receive the message between base stations from the neighboring base station as a response to a message from the BS 200 to the neighboring base station. This enables the controller 214 to acquire the information for determination using the message from the BS 200 as a trigger.

In addition, the controller 214 may include the information for determination for determining whether or not the RedCap UE and the BS 200 can communicate with each other in the message from the BS 200 to the neighboring base station. This enables the BS 200 to notify the neighboring base station whether or not the RedCap UE and the BS 200 can communicate with each other.

In addition, the information for determination may include at least one of information indicating whether or not the neighboring base station or the cell managed by the neighboring base station can accept the RedCap UE, information indicating whether or not the neighboring base station or the cell can accept the user equipment equipped with a single receive branch in the RedCap UE, or information indicating whether or not the neighboring base station or the cell can accept the UE 100 equipped with two receive branches in the RedCap UE. This enables the controller 214 to grasp whether or not the neighboring base station or the cell managed by the neighboring base station can accept the RedCap UE. In addition, the controller 214 can grasp whether or not the neighboring base station or the cell can accept the user equipment equipped with a single receive branch in the RedCap UE. In addition, the controller 214 can grasp whether or not the neighboring base station or the cell can accept the UE 100 equipped with two receive branches among the RedCap UEs.

The controller 214 determines cells that become candidates for the handover destination of the RedCap UE on the basis of the information for determination. This enables the BS 200 to appropriately control a handover destination of the RedCap UE.

On the basis of the information for determination, the controller 214 determines whether or not to designate the cell managed by the neighboring base station as a measurement object for which the RedCap UE is to measure radio quality. This enables the BS 200 to appropriately control the measurement object of the RedCap UE.

In addition, in the BS 200, the controller 214 generates information for determination for the neighboring base station to determine whether or not the RedCap UE and the BS 200 can communicate with each other. The network communicator 213 transmits the information for determination to the neighboring base station. This enables the BS 200 to notify the neighboring base station whether or not the RedCap UE and the BS 200 can communicate with each other. The neighboring base station can appropriately control the handover destination of the RedCap UE on the basis of the information for determination.

Note that, hereinafter, operation of the functional units (specifically, the communicator 212, the network communicator 213, and the controller 214) included in the BS 200 may be described as the operation of the BS 200.

(2) System Operation (2.1) Operation Example 1

Figure 5:
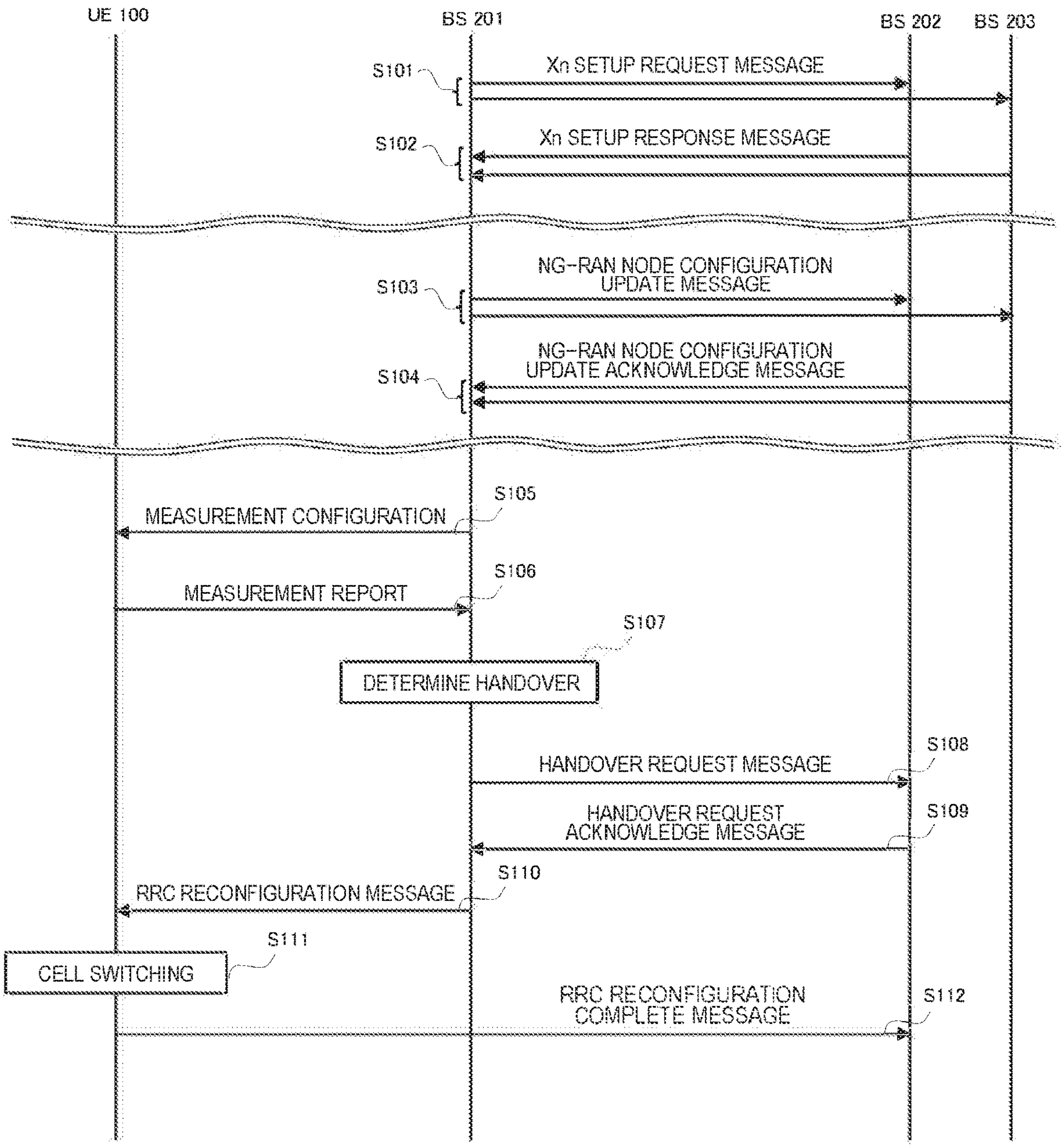
FIG. 5 is a view illustrating Operation Example 1 of a mobile communication system according to the embodiment of the present disclosure.

Operation Example 1 of the UE 100 and the BS 200 (BS 201, BS 202, BS 203) according to the embodiment of the present disclosure will be described with reference to FIG. 5.

In the present operation example, for the BS 201, the BS 202 and the BS 203 are neighboring base stations. The description will be given assuming that the BS 201 and the BS 202 can communicate with the RedCap UE, and the BS 203 cannot communicate with the RedCap UE. Thus, the BS 201 and the BS 202 support communication with the RedCap UE. The BS 203 does not support communication with the RedCap UE.

Step S101:

The network communicator 213 of the BS 201 transmits an Xn setup request message to the BS 202 and the BS 203. The network communicators 213 of the BS 202 and the BS 203 receive the Xn setup request message from the BS 201.

The Xn setup request message is a message to be used to establish an interface between bases stations. The Xn setup request message is transmitted, for example, when Xn setup procedure for establishing an Xn interface is started. The Xn setup request message is transmitted, for example, to the neighboring base station to transfer application data.

The controller 214 of the BS 201 may include information for determination for determining whether or not the RedCap UE and the BS 201 can communicate with each other in the Xn setup request message. Details of the information for determination will be described later. The controllers 214 of the BS 202 and the BS 203 may determine that the RedCap UE and the BS 201 can communicate with each other on the basis of the information for determination.

Step S102:

The network communicators 213 of the BS 202 and the BS 202 transmit an Xn setup response message to the BS 201. The network communicator 213 of the BS 201 receives the Xn setup response message including the information for determination from each of the BS 202 and the BS 203.

The Xn setup response message is a message to be used to establish an interface between bases stations. The Xn setup response message is transmitted in a case where the Xn setup procedure is successful. The Xn setup response message is a response message to the Xn setup request message.

The controller 214 of the BS 202 generates information for determination for determining whether or not the RedCap UE and the BS 202 can communicate with each other. The controller 214 of the BS 202 includes the generated information for determination in the Xn setup response message. The information for determination may include at least one of the following information:

- Information indicating whether or not the cell managed by the BS 202 or the BS 202 can accept the RedCap UE (hereinafter, appropriately referred to as redCap-AccessAllowed)
- Information indicating whether or not the cell managed by the BS 202 or the BS 202 can accept the RedCap UE equipped with a single receive branch among the RedCap UEs (hereinafter, appropriately referred to as singleRx-AccessAllowed)
- Information indicating whether or not the cell managed by the BS 202 or the BS 202 can accept the RedCap UE equipped with two receive branches among the RedCap UEs (hereinafter, appropriately referred to as twoRx-AccessAllowed)

redCap-AccessAllowed may be any of the following information:

- Information indicating that the BS 202 (RAN node) supports the RedCap UE
- Information indicating whether or not the BS 202 (RAN node) supports the RedCap UE
- Information indicating that the RedCap UE is allowed to access the BS 202 (RAN node)
- Information indicating whether or not the RedCap UE is allowed to access the BS 202 (RAN node)
- Information indicating that the RedCap UE is permitted to camp on the BS 202 (RAN node)
- Information indicating whether or not to permit the RedCap UE to camp on the BS 202 (RAN node)

As illustrated in FIG. 6, in a case where redCap-AccessAllowed is associated with each cell (for example, a physical cell ID) of the BS 202, redCap-AccessAllowed may be any of the following information:

- Information indicating that the cell supports the RedCap UE
- Information indicating whether or not the cell supports the RedCap UE
- Information indicating that the RedCap UE is allowed to access the cell
- Information indicating whether or not the RedCap UE is allowed to access the cell
- Information indicating that the RedCap UE is permitted to camp on the cell Information indicating whether or not to permit the RedCap UE to camp on the cell singleRx-AccessAllowed may be any of the following information:

- Information indicating that the BS 202 (RAN node) supports the RedCap UE equipped with a single receive branch
- Information indicating whether or not the BS 202 (RAN node) supports the RedCap UE equipped with a single receive branch
- Information indicating that the RedCap UE equipped with a single receive branch is allowed to access the BS 202 (RAN node)

Information indicating whether or not the RedCap UE equipped with a single receive branch is allowed to access the BS 202 (RAN node)

Information indicating that the RedCap UE equipped with a single receive branch is permitted to camp on the BS 202 (RAN node)

Information indicating whether or not to permit the RedCap UE equipped with a single receive branch to camp on the BS 202 (RAN node)

As illustrated in FIG. 6, in a case where singleRx-AccessAllowed is associated with each cell (for example, a physical cell ID) of the BS 202, singleRx-AccessAllowed may be any of the following information:

Information indicating that the cell supports the RedCap UE equipped with a single receive branch Information indicating whether or not the cell supports the RedCap UE equipped with a single receive branch Information indicating that the RedCap UE equipped with a single receive branch is allowed to access the cell Information indicating whether or not the RedCap UE equipped with a single receive branch is allowed to access the cell Information indicating that the RedCap UE equipped with a single receive branch is permitted to camp on the cell Information indicating whether or not to permit the RedCap UE equipped with a single receive branch to camp on the cell twoRx-AccessAllowed may be any of the following information:

Information indicating that the BS 202 (RAN node) supports the RedCap UE equipped with two receive branches Information indicating whether or not the BS 202 (RAN node) supports the RedCap UE equipped with two receive branches Information indicating that the RedCap UE equipped with two receive branches is allowed to access the BS 202 (RAN node)

Information indicating whether or not the RedCap UE equipped with two receive branches is allowed to access the BS 202 (RAN node)

Information indicating that the RedCap UE equipped with two receive branches is permitted to camp on the BS 202 (RAN node)

Information indicating whether or not to permit the RedCap UE equipped with two receive branches to camp on the BS 202 (RAN node)

As illustrated in FIG. 6, in a case where twoRx-AccessAllowed is associated with each cell (for example, a physical cell ID) of the BS 202, twoRx-AccessAllowed may be any of the following information:

Information indicating that the cell supports the RedCap UE equipped with two receive branches Information indicating whether or not the cell supports the RedCap UE equipped with two receive branches Information indicating that the RedCap UE equipped with two receive branches is allowed to access the cell Information indicating whether or not the RedCap UE equipped with two receive branches is allowed to access the cell Information indicating that the RedCap UE equipped with two receive branches is permitted to camp on the cell Information indicating whether or not to permit the RedCap UE equipped with two receive branches to camp on the cell The controller 214 of the BS 203 may generate information for determination similarly to the BS 202. The controller 214 of the BS 203 includes the information for determination in the Xn setup response message. Alternatively, the controller 214 of the BS 203 does not have to generate the information for determination. The controller 214 of the BS 203 does not have to include the information for determination in the Xn setup response message.

The controller 214 of the BS 201 acquires the information for determination. The controller 214 of the BS 201 determines that the RedCap UE and the BS 202 can communicate with each other on the basis of the information for determination received from the BS 202. In a case where the information for determination includes at least one of redCap-AccessAllowed, singleRx-AccessAllowed, or twoRx-AccessAllowed, the controller 214 of the BS 201 may determine that the RedCap UE and the BS 202 can communicate with each other.

The controller 214 of the BS 201 determines that the RedCap UE and the BS 203 cannot communicate with each other on the basis of the information for determination received from the BS 203. In a case where the information for determination is not included in the Xn setup response message from the BS 201, the controller 214 of the BS 203 may determine that the RedCap UE and the BS 203 cannot communicate with each other.

Step S103:

The network communicator 213 of the BS 201 transmits an NG-RAN node configuration update message to the BS 202 and the BS 203. The network communicators 213 of the BS 202 and the BS 203 receive the NG-RAN node configuration update message from the BS 201.

The NG-RAN node configuration update message is a message related to update of the base station configuration. The NG-RAN node configuration update message is transmitted when update procedure of the base station configuration is started. The NG-RAN node configuration update message is transmitted to the neighboring base station to update required application-level configuration data.

The controller 214 of the BS 201 may include information for determination for determining whether or not the RedCap UE and the BS 201 can communicate with each other in the NG-RAN node configuration update message. Details of the information for determination will be described later. The controllers 214 of the BS 202 and the BS 203 may determine that the RedCap UE and the BS 201 can communicate with each other on the basis of the information for determination.

Step S104:

The network communicators 213 of the BS 202 and the BS 202 transmit an NG-RAN node configuration update acknowledge message to the BS 201. The network communicator 213 of the BS 201 receives the NG-RAN node configuration update acknowledge message including the information for determination from each of the BS 202 and the BS 203.

The NG-RAN node configuration update acknowledge message is a message related to update of the base station configuration. The NG-RAN node configuration update acknowledge message is transmitted when update procedure of the base station configuration is successful. The NG-RAN node configuration update acknowledge message is a response message to the NG-RAN node configuration update message.

The controller 214 of the BS 202 may include the information for determination in the NG-RAN node configuration update acknowledge message. The controller 214 of the BS 203 may include the information for determination in the NG-RAN node configuration update acknowledge message.

Alternatively, the controller 214 of the BS 203 does not have to generate the information for determination. Thus, the controller 214 of the BS 203 does not have to include the information for determination in the NG-RAN node configuration update acknowledge message.

Similarly to step S102, the controller 214 of the BS 201 may determine that the RedCap UE and the BS 202 can communicate with each other on the basis of the information for determination received from the BS 202. The controller 214 of the BS 201 may determine that the RedCap UE and the BS 202 cannot communicate with each other on the basis of the Xn setup response message.

Description will be given assuming that, thereafter, the UE 100 is in the RRC connected state in which there is an RRC connection between the RRC of the UE 100 and the RRC of the base station 200.

Note that, for example, when the RRC connection is established with the UE 100, the controller 214 of the BS 201 may receive, from the UE 100, at least one of information indicating whether or not the UE 100 is the RedCap UE, information indicating whether or not the UE 100 is the RedCap UE equipped with a single receive branch, or information indicating whether or not the UE 100 is the RedCap UE equipped with two receive branches.

The controller 214 of the BS 201 may determine whether or not to designate the cell managed by each of the BS 202 and the BS 203 as a measurement object for which the UE 100 is to measure radio quality on the basis of the information for determination.

In a case where the UE 100 is the RedCap UE, the controller 214 of the BS 201 specifies a cell that can accept the RedCap UE. In a case where the UE 100 is the RedCap UE equipped with a single receive branch, the controller 214 of the BS 201 specifies a cell that can accept the RedCap UE equipped with a single receive branch. In a case where the UE 100 is the RedCap UE equipped with two receive branches, the controller 214 of the BS 201 specifies a cell that can accept the RedCap UE equipped with two receive branches. The controller 214 of the BS 201 may include a list of cells (for example, a whitelist) designated as cells to be measured in the measurement configuration.

In a case where the UE 100 is the RedCap UE, the controller 214 of the BS 201 may include the cell as a cell not to be measured in a list of cells that cannot accept the RedCap UE (for example, a blacklist). In a case where the UE 100 is the RedCap UE equipped with a single receive branch, the controller 214 of the BS 201 may include the cell in the list of cells that cannot accept the RedCap UE equipped with a single receive branch as a cell not to be measured even if the cell can accept the RedCap UE. In a case where the UE 100 is the RedCap UE equipped with two receive branches, the controller 214 of the BS 201 may include the cell in the list of cells that cannot accept the RedCap UE equipped with two receive branches as a cell not to be measured even if the cell can accept the RedCap UE.

Step S105:

The communicator 212 of the BS 201 transmits a measurement configuration to the UE 100. The communicator 120 of the UE 100 receives the measurement configuration. The controller 130 of the UE 100 measures radio quality according to the measurement configuration.

The controller 130 of the UE 100 measures radio quality of the cell included in the list of the cells designated as the cells to be measured. On the other hand, the controller 130 of the UE 100 does not measure radio quality of the cells included in the list of the cells designated as the cells not to be measured.

Step S106:

The communicator 120 of the UE 100 transmits a measurement report to the BS 201. The communicator 212 of the BS 201 receives the measurement report from the UE 100.

Step S107:

The controller 214 of the BS 201 determines handover of the UE 100 on the basis of the measurement report.

Furthermore, as illustrated in FIGS. 7 and 8, the controller 214 of the BS 201 may determine cells that become candidates for a handover destination of the UE 100 on the basis of the information for determination included in the message between base stations. In a case where the UE 100 is the RedCap UE, the controller 214 of the BS 201 determines cells that can accept the RedCap UE as a candidate cell for the handover destination. In a case where the UE 100 is the RedCap UE equipped with a single receive branch, the controller 214 of the BS 201 determines cells that can accept the RedCap UE equipped with a single receive branch as the candidate cell for the handover destination. In a case where the UE 100 is the RedCap UE equipped with two receive branches, the controller 214 of the BS 201 determines cells that can accept the RedCap UE equipped with two receive branches as the candidate cell for the handover destination.

For example, the controller 214 of the BS 201 selects a cell having radio quality better than a predetermined reference value as a handover destination cell from among the candidate cell on the basis of the measurement report. In this operation example, the controller 214 of the BS 201 starts control to transmit a handover request message to the BS 202 that manages the selected cell.

Step S108:

The network communicator 213 of the BS 201 transmits the handover request message to the BS 202. The network communicator 213 of the BS 202 receives the handover request message from the BS 201.

The controller 214 of the BS 202 determines whether or not to acknowledge the handover request. In the present operation example, description will proceed on the assumption that the controller 214 of the BS 202 determines to acknowledge the handover request.

Step S109:

The network communicator 213 of the BS 202 transmits a handover request acknowledge message to the BS 201. The network communicator 213 of the BS 201 receives the handover request acknowledge message from the BS 202.

Step S110:

The communicator 212 of the BS 201 transmits an RRC reconfiguration message for triggering handover to the UE 100. The communicator 120 of the UE 100 receives the RRC reconfiguration message from the BS 201.

In the present operation example, the RRC reconfiguration message is a message for causing the UE 100 to handover to the cell of the BS 202.

Step S111:

The controller 130 of the UE 100 detaches from the cell of the BS 201 and synchronizes with the cell of the BS 202. In other words, the controller 130 of the UE 100 executes cell switching.

Step S112:

In a case where the handover procedure is completed, the communicator 120 of the UE 100 transmits an RRC reconfiguration complete message to the BS 202. The communicator 212 of the BS 202 receives the RRC reconfiguration complete message from the UE 100.

(2.2) Operation Example 2

Figure 9:
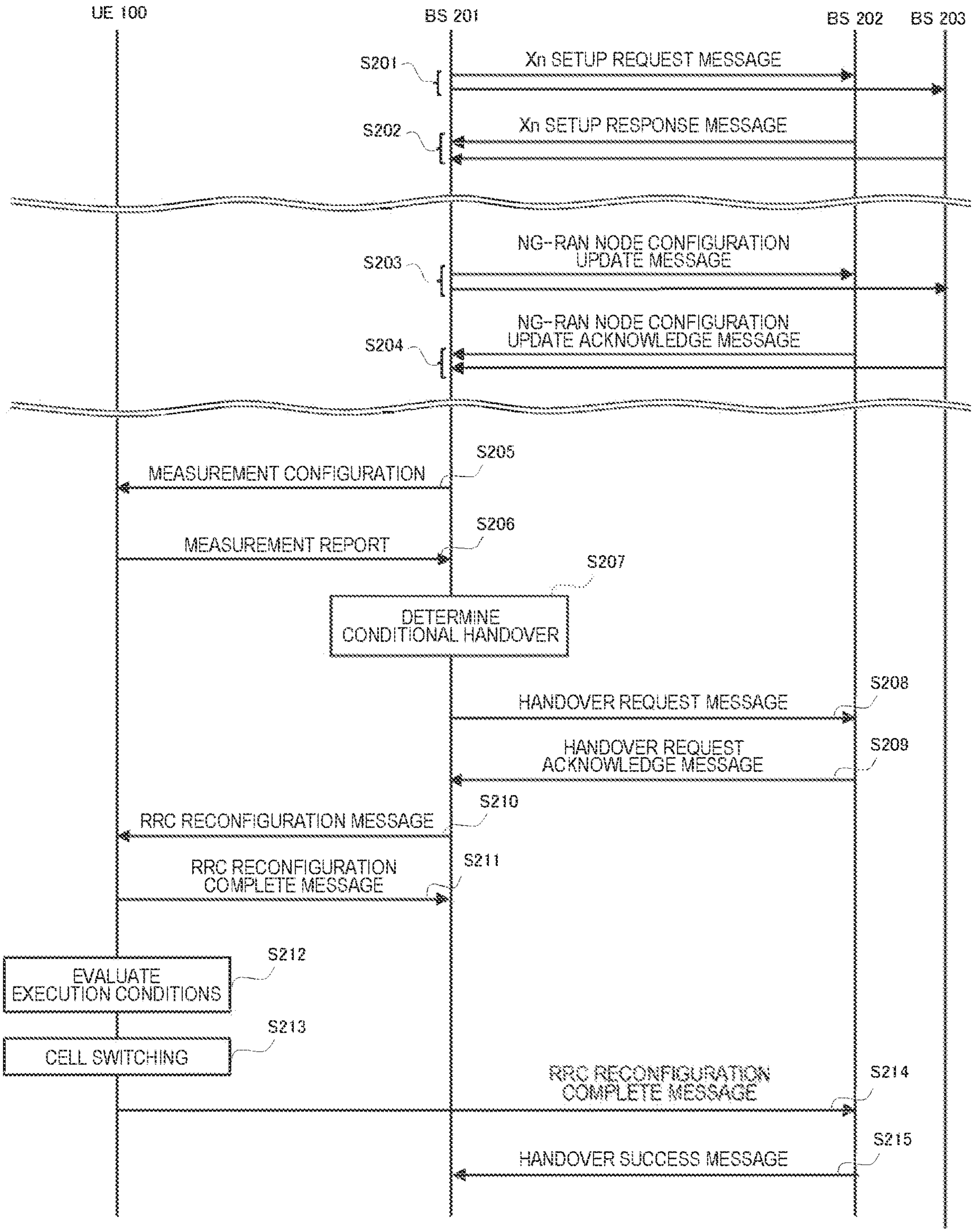
FIG. 9 is a view illustrating Operation Example 2 of the mobile communication system according to the embodiment of the present disclosure.

Operation Example 2 of the UE 100 and the BS 200 according to the embodiment of the present disclosure will be described with reference to FIG. 9. Differences from the above-described content will be mainly described. While a case has been described in Operation Example 1 where general handover is performed, a case will be described in Operation Example 2 where conditional handover (CHO) is performed.

Steps S201 to S206:

This is similar to steps S101 to S106 in Operation Example 1.

Step S207:

The controller 214 of the BS 201 determines to perform conditional handover to the UE 100.

The controller 214 of the BS 201 determines a transmission destination of a handover request message for requesting conditional handover on the basis of information for determination.

The controller 214 of the BS 201 may determine a candidate cell for a handover destination of the UE 100 on the basis of the information for determination as in step S107. In a case where the UE 100 is the RedCap UE, the controller 214 of the BS 201 determines cells that can accept the RedCap UE as the candidate cell. In a case where the UE 100 is the RedCap UE equipped with a single receive branch, the controller 214 of the BS 201 determines cells that can accept the RedCap UE equipped with a single receive branch as the candidate cell. In a case where the UE 100 is the RedCap UE equipped with two receive branches, the controller 214 of the BS 201 determines cells that can accept the RedCap UE equipped with two receive branches as the candidate cell.

In the present operation example, the controller 214 of the BS 201 determines the BS 202 that manages the candidate cell as a transmission destination (candidate target base station) of the handover request message. On the other hand, the controller 214 of the BS 201 determines not to transmit the handover request message to the BS 203 that does not manage the candidate cell.

Step S208:

The network communicator 213 of the BS 201 transmits a handover request message for each candidate cell to the BS 202. The network communicator 213 of the BS 202 receives the handover request message for each candidate cell from the BS 201.

Similarly to step S108, the controller 214 of the BS 202 determines whether or not to acknowledge the handover request.

Step S209:

The network communicator 213 of the BS 202 transmits a handover request acknowledge message including configurations of the candidate cell for the conditional handover to the BS 201 for each candidate cell. The network communicator 213 of the BS 201 receives the handover request acknowledge message from the BS 202.

Step S210:

The communicator 212 of the BS 201 transmits an RRC reconfiguration message to the UE 100. The communicator 120 of the UE 100 receives the RRC reconfiguration message from the BS 201.

The RRC reconfiguration message includes the configurations of the candidate cell for the conditional handover and execution conditions of the conditional handover.

Step S211:

The communicator 120 of the UE 100 transmits an RRC reconfiguration complete message to the BS 201. The communicator 212 of the BS 201 receives the RRC reconfiguration complete message from the UE 100.

Step S212:

The controller 130 of the UE 100 starts evaluation of the execution conditions of the conditional handover. The controller 130 of the UE 100 maintains the RRC connection with the BS 201 after receiving the configurations of the candidate cell for the conditional handover.

Step S213:

In a case where a candidate cell satisfies the corresponding execution conditions of the conditional handover, the controller 130 of the UE 100 detaches from the cell of the BS 201 and synchronizes with the candidate cell. In other words, the controller 130 of the UE 100 executes cell switching.

Step S214:

In a case where the handover procedure is completed, the communicator 120 of the UE 100 transmits an RRC reconfiguration complete message to the BS 202. The communicator 212 of the BS 202 receives the RRC reconfiguration complete message from the UE 100.

Step S215:

In a case where the handover is successful, the network communicator 213 of the BS 202 transmits a handover success message to the BS 201. The network communicator 213 of the BS 201 receives the handover success message from the BS 202.

OTHER EMBODIMENTS

Although the embodiment of the present disclosure has been described above, the present disclosure is not limited to the embodiment. For example, the message between base stations may be a message other than the above-described message.

Furthermore, in each operation example described above, singleRx-AccessAllowed is information regarding a single receive branch, but singleRx-AccessAllowed is not limited thereto. singleRx-AccessAllowed may be information about any of a single receive chain, a single receiver, and a single reception antenna port. Thus, in the foregoing operation examples, “a single receive branch” may be replaced with “a single receive chain”, “a single receiver”, and “a single reception antenna port”.

Furthermore, in each operation example described above, twoRx-AccessAllowed is information regarding two receive branches, but twoRx-AccessAllowed is not limited thereto. singleRx-AccessAllowed may be information about any of two receive chains, two receivers, and two reception antenna ports. Thus, in the foregoing operation examples, “two receive branches” may be replaced with “two receive chains”, “two receivers”, and “two reception antenna ports”.

In addition, the above-described operation examples are not limited to a case of being separately and independently implemented, and the operation examples can be appropriately combined and implemented. Furthermore, for example, the steps in the processing described in the present specification do not necessarily need to be executed in time series in the order described in the flowchart or the sequence diagram. For example, the steps in the processing may be executed in the order different from the order described as the flowchart or the sequence diagram, or may be executed in parallel. Also, some of the steps in the processing may be deleted, and further steps may be added to the processing. Furthermore, the above-described operation flows are not limited to a case of being separately and independently implemented, and two or more operation flows can be combined and implemented. For example, some steps of one operation flow may be added to another operation flow, or some steps of one operation flow may be replaced with some steps of another operation flow.

For example, a method that includes operation of one or more components of the apparatus described herein may be provided, and a program for causing a computer to perform the operation of the components may be provided. Furthermore, a non-transitory tangible computer-readable storage medium recording the program may be provided. Such a method, a program, and a non-transitory tangible computer-readable storage medium are also included in the present disclosure. Furthermore, at least part of the UE 100 or at least part of the BS 200 may be a chip set or a SoC (System on Chip) in which circuits that execute the processing performed by the UE 100 or the BS 200 are integrated.

Note that, in the above-described embodiment, "transmit" may mean to perform processing of at least one layer in a protocol stack used for transmission, or may mean to physically transmit a signal wirelessly or by wire. Alternatively, "transmit" may mean a combination of performing the processing of at least one layer and physically transmitting a signal wirelessly or by wire. Similarly, "receive" may mean to perform processing of at least one layer in a protocol stack used for reception, or may mean to physically receive a signal wirelessly or by wire. Alternatively, "receive" may mean a combination of performing the processing of at least one layer and physically receiving a signal wirelessly or by wire.

Although the present disclosure has been described in accordance with examples, it is understood that the present disclosure is not limited to the examples and structures. The present disclosure also includes various modifications and modifications within an equivalent range. In addition, various combinations and modes, and other combinations and modes including only one element, more elements, or less elements are also within the scope and idea of the present disclosure.

The invention claimed is:

1. A first base station, comprising:

a network communicator configured to receive, from a second base station, an Xn setup request message including first information used for indicating that a cell of the second base station supports Reduced Capability (RedCap) user equipment, the first information including second information indicating whether RedCap user equipment equipped with a single receive branch is allowed to access the cell and third information indicating whether RedCap user equipment equipped with two receive branches is allowed to access the cell; and a controller configured to determine a target of a handover of a particular RedCap user equipment based on at least one of the first information, the second information, and the third information.

2. The first base station according to claim 1, wherein:

the network communicator is configured to transmit an Xn setup response message to the second base station, and whether a cell of the first base station supports RedCap user equipment is indicated based on whether information used for indicating that the cell of the first base station supports RedCap user equipment is included in the Xn setup response message.

3. The first base station according to claim 1, wherein:

the network communicator is configured to transmit, to the second base station, a configuration update message including information used for indicating that a cell of the first base station supports RedCap user equipment.

4. A communication method to be executed in a first base station, the communication method comprising:

receiving, from a second base station, an Xn setup request message including first information used for indicating that a cell of the second base station supports Reduced Capability (RedCap) user equipment, the first information including second information indicating whether RedCap user equipment equipped with a single receive branch is allowed to access the cell and third information indicating whether RedCap user equipment equipped with two receive branches is allowed to access the cell; and determining a target of a handover of a particular RedCap user equipment based on at least one of the first information, the second information, and the third information.

5. The communication method according to claim 4, further comprising transmitting an Xn setup response message to the second base station, wherein:

whether a cell of the first base station supports RedCap user equipment is indicated based on whether information used for indicating that the cell of the first base station supports RedCap user equipment is included in the Xn setup response message.

6. The communication method according to claim 4, further comprising transmitting, to the second base station, a configuration update message including information used for indicating that a cell of the first base station supports RedCap user equipment.

* * * * *